(12) United States Patent
Christy et al.

(10) Patent No.: US 12,710,361 B2
(45) Date of Patent: Aug. 18, 2026

(54) ESTIMATING GAS QUANTITY IN A PIXEL BASED ON SPECTRAL MATCHED FILTERING

(71) Applicant: Maxar Technologies Holdings Inc., Westminster, CO (US)

(72) Inventors: Joseph Christy, Ann Arbor, MI (US); Andreas Hayden, Ann Arbor, MI (US)

(73) Assignee: Maxar Technologies Holdings Inc., Westminster, CO (US)

( * ) Notice: Subject to any disclaimer, the term of this patent is extended or adjusted under 35 U.S.C. 154(b) by 920 days.

(21) Appl. No.: 17/929,304

(22) Filed: Sep. 1, 2022

(65) Prior Publication Data

US 2024/0077416 A1 Mar. 7, 2024

(51) Int. Cl.

*G01J 3/02* (2006.01)
*G01J 3/28* (2006.01)
*G01N 21/3504* (2014.01)

(52) U.S. Cl.

CPC ........ *G01N 21/3504* (2013.01); *G01J 3/2823* (2013.01); *G01J 2003/2826* (2013.01); *G01J 2003/2836* (2013.01)

(58) Field of Classification Search

None

See application file for complete search history.

(56) References Cited

U.S. PATENT DOCUMENTS 6,295,859 B1 * 10/2001 Hayden .............. G01N 21/3504 73/30.01
6,958,466 B1 * 10/2005 Stein ...................... G06V 20/13 250/221
2003/0038237 A1 * 2/2003 Webber ............. G01N 21/3504 250/339.12
2016/0097713 A1 * 4/2016 Kester ................... G01J 3/2823 356/51

OTHER PUBLICATIONS

Sanchez-Garcia, Elena et al. Mapping methane plumes at very high spatial resolution with the WorldView-3 Satellite; Atmospheric Measurement Techniques; https://doi.org/10.5194/amt-2021-238; Sep. 21, 2021 (26 pgs).
Notification of Transmittal of the International Search Report and the Written Opinion of the International Searching Authority issued in corresponding International Application PCT/US2023/071329 mailed Nov. 3, 2023 (16 pages).
M. D. Foote et al., "Fast and Accurate Retrieval of Methane Concentration From Imaging Spectrometer Data Using Sparsity Prior," in IEEE Transactions on Geoscience and Remote Sensing, vol. 58, No. 9, pp. 6480-6492, Sep. 2020, doi: 10.1109/TGRS.2020.2976888. (13 pages).

(Continued)

*Primary Examiner* — John E Breene
*Assistant Examiner* — Alex T Devito
(74) *Attorney, Agent, or Firm* — Fish & Richardson P.C.

(57) ABSTRACT

Gas quantity in a pixel may be estimated based on spectral matched filtering. Image data associated with a scene may be received. The scene may comprise a plurality of pixels. Next, a spectral matched filter may be constructed for a (Continued)

predetermined gas and based on the image data. A quantity of the predetermined gas may then be estimated in at least one of the plurality of pixels by applying the spectral matched filter to the image data.

20 Claims, 3 Drawing Sheets

(56) References Cited

OTHER PUBLICATIONS

Alana K. Ayasse et al., "Methane Mapping with Future Satellite Imaging Spectrometers" Remote Sensing, 2019, 11, 3054; doi:10.3390/rs11243054 (19 pages).
G.C. Hulley et al., "High spatial resolution imaging of methane and other trace gases with the airborne Hyperspectral Thermal Emission Spectrometer (HyTES)"; Atmos. Meas. Tech., 9, 2393-2408, https://doi.org/10.5194/amt-9-2393-2016, 2016. (32 pages).
Luis Guanter et al. "Mapping methane point emissions with the PRISMA spaceborne imaging spectrometer" Remote Sensing of Environment, vol. 265, Nov. 2021, 112671 (14 pages).
D.R. Thompson et al. "Space-based remote imaging spectroscopy of the Aliso Canyon CH4 superemitter" AGU Geophysical Research Letters; May 28, 2016 https://doi.org/10.1002/2016GL069079 (8 pages).

* cited by examiner

ESTIMATING GAS QUANTITY IN A PIXEL BASED ON SPECTRAL MATCHED FILTERING

TECHNICAL FIELD

The present disclosure relates generally to estimating gas quantity in a pixel based on spectral matched filtering.

BACKGROUND

Satellite images are images of Earth collected by imaging satellites operated by governments and businesses around the world. Satellite imaging companies sell images by licensing them to governments and businesses. Satellite images have many applications in meteorology, oceanography, fishing, agriculture, biodiversity conservation, forestry, landscape, geology, cartography, regional planning, and education. Images may be in visible colors and in other spectra. There are also elevation maps, usually made by radar images. Image interpretation and analysis of satellite imagery may be conducted using software.

Satellite imaging may be used to identify a greenhouse gas. A greenhouse gas is a gas that absorbs and emits radiant energy within the thermal infrared range, causing the greenhouse effect. The primary greenhouse gases in Earth's atmosphere are water vapor, Carbon Dioxide, Methane, Nitrous Oxide, and Ozone. Human activities since the beginning of the Industrial Revolution have increased the atmospheric concentration of Carbon Dioxide. The majority of Carbon Dioxide emissions come from combustion of fossil fuels, primarily coal, petroleum, and natural gas, with additional contributions from cement manufacturing, fertilizer production, deforestation, and other changes in land use.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
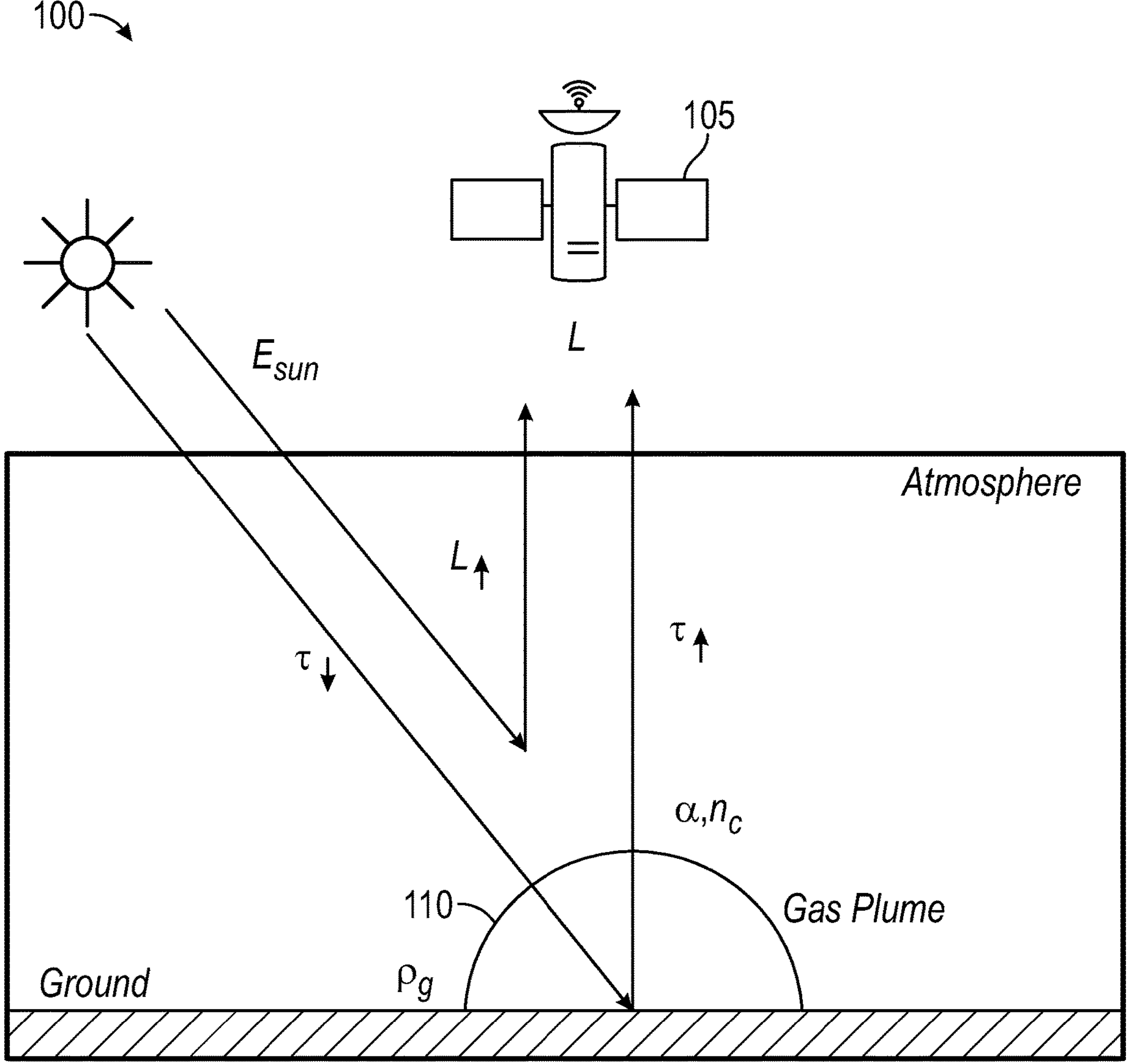
FIG. 1 is a block diagram of an operating environment for estimating gas quantity in a pixel based on spectral matched filtering.

Gas quantity in a pixel may be estimated based on spectral matched filtering. Image data associated with a scene may be received. The scene may comprise a plurality of pixels. Next, a spectral matched filter may be constructed for a predetermined gas and based on the image data. A quantity of the predetermined gas may then be estimated in at least one of the plurality of pixels by applying the spectral matched filter to the image data.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Methane is a major contributor to global climate change. The detection of Methane from industrial sources has been identified as an effective climate change mitigation strategy. Locating and quantifying Methane sources may comprise an important means in fighting climate change. These Methane sources, such as from coal mining and Oil and Gas (O&G) extraction, may occur as large plumes of highly concentrated gas. Controlling the main contributors of Methane emissions may comprise an effective way to mitigate climate change caused by such emissions. Consistent with embodiments of the disclosure, satellite imaging may be used to map gas plumes (e.g., Methane plumes) from space. Furthermore, embodiments of the disclosure may estimate the gas quantity of these plumes based on spectral matched filtering. Spectral matched filtering may provide twice the sensitivity compared to conventional band ratio processes for example.

FIG. 1 shows an operating environment for estimating gas quantity in a pixel based on spectral matched filtering. As shown in FIG. 1, operating environment 100 may comprise a satellite 105 and a gas plume 110. Satellite 105 may comprise a commercial Earth observation and imaging satellite used or designed for Earth Observation (EO) from orbit, including environmental monitoring, meteorology, cartography, and others. Satellite 105 may collect, in addition to standard panchromatic and multispectral bands, eight-band Short-Wave Infrared (SWIR) and 12 Clouds Aerosols Vapors Ice and Snow (CAVIS) imagery. The orbiting altitude of satellite 105 may comprise, but is not limited to, 617 km. The eight SWIR bands may comprise, but are not limited to: 1195 nm-1225 nm, 1550 nm-1590 nm, 1640 nm-1680 nm, 1710 nm-1750 nm, 2145 nm-2185 nm, 2185 nm-2225 nm, 2235 nm-2285 nm, and 2295 nm-2365 nm.

Gas plume 110 may comprise a large quantity of a predetermined gas that rises from the Earth's surface into the air in a column. The predetermined gas may comprise Methane, however, embodiments of the disclosure are not limited to Methane and the predetermined gas may comprise any gas. Gas plume 110 may comprise industrial emissions, such as from coal mining or Oil and Gas (O&G) extraction. Furthermore, gas plume 110 may comprise a nature source occurring from a crack in the Earth's surface venting the predetermined gas. Regardless of the source, the predetermined gas may occur as a large plume of highly concentrated gas.

Figure 2:
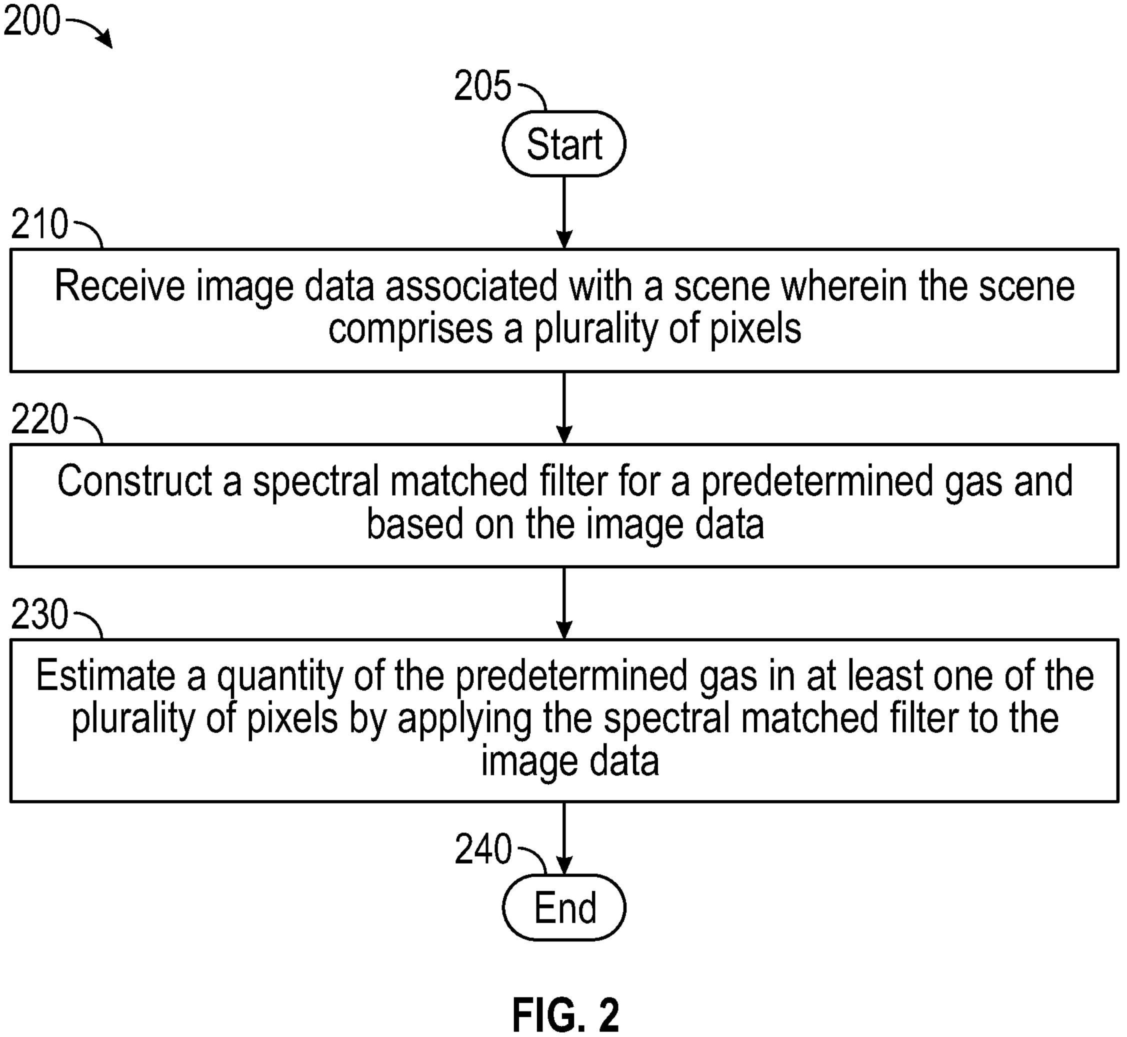
FIG. 2 is a flow chart of a method for estimating gas quantity in a pixel based on spectral matched filtering.

FIG. 2 is a flow chart setting forth the general stages involved in a method 200 consistent with embodiments of the disclosure for estimating gas quantity in a pixel based on spectral matched filtering. Method 200 may be implemented using a computing device 400 as described in more detail below with respect to FIG. 4. Ways to implement the stages of method 200 will be described in greater detail below.

Method 200 may begin at starting block 205 and proceed to stage 210 where computing device 400 may receive image data associated with a scene wherein the scene comprises a plurality of pixels. For example, satellite 105 may take images of Earth's surface from space and provide them to computing device 400. Computing device 400, for example, may be deployed in satellite 105. Notwithstanding, computing device 400 may be deployed anywhere and the image data may be transmitted from satellite 105 to a network, for example, and then sent to computing device 400.

These images may comprise images taken in some or all of the SWIR bands, for example, as described above. Furthermore, satellite 105 may take images of gas plume 110. One of these images may comprise the scene that may comprise the plurality of pixels.

From stage 210, where computing device 400 receives image data associated with the scene wherein the scene comprises the plurality of pixels, method 200 may advance to stage 220 where computing device 400 may construct a spectral matched filter for a predetermined gas and based on the image data. For example, embodiments of the disclosure may estimate gas quantity in a pixel based on the following model of light transportation in the atmosphere using a spectral matched filter.

As shown in FIG. 1, light from the sun may be transmitted down through the atmosphere, through gas plume 110, reflected off the ground, back through gas plume 110, through the atmosphere to a sensor in satellite 105. Light may also reach the sensor in satellite 105 via scattering from the atmosphere, never interacting with gas plume 110 or the ground. Quantities shown in FIG. 1 may comprise:

$E_{sun}$—solar spectral irradiance
$\tau_{\downarrow}$—atmospheric transmission sun-ground
$\tau_{\uparrow}$—atmospheric transmission ground-sensor
$\rho_g$—ground spectral reflectance
$\alpha$—methane spectral absorption
$n_c$—column depth of methane
$L_{\uparrow}$—atmospheric scattered light
L—at sensor spectral radiance These quantities of FIG. 1 may comprise spectral quantities except for $n_c$. In the following, spectral quantities may be indicated with a subscript i, which for the example of SWIR images may run from 1 to 8 representing the spectral features in the 8 SWIR bands described above.

Light reaching sensor when no gas plume is present:

$$L_{0,i} = E_{sun,i}\tau_{\downarrow,i}\frac{\rho_{g,i}}{\pi}\tau_{\uparrow,i} + L_{\uparrow,i} \tag{1}$$

Light reaching sensor when gas plume 110 is present:

$$L_i = E_{sun,i}\tau_{\downarrow,i}\frac{\rho_{g,i}}{\pi}e^{-2n_c\alpha_i}\tau_{\uparrow,i} + L_{\uparrow,i} \tag{2}$$

The exponential term is Beer's law for light transmission through an absorbing material. Linear approximation to exponent:

$$e^{-2n_c\alpha_i} \approx 1 - 2n_c\alpha_i \tag{3}$$

Rewrite equation (2) using equation (3):

$$L_i = E_{sun,i}\tau_{\downarrow,i}\frac{\rho_{g,i}}{\pi}\tau_{\uparrow,i} - 2n_c\alpha_i E_{sun,i}\tau_{\downarrow,i}\frac{\rho_{g,i}}{\pi}\tau_{\uparrow,i} + L_{\uparrow,i} \tag{4}$$

Combine equations (1) and (4):

$$L_i = L_{0,i} - 2n_c\alpha_i(L_{0,i} - L_{\uparrow,i}) \tag{5}$$

L(↑,i) may be estimated by assuming that somewhere in the image there is a dark pixel, either a shadow or low reflectance material, which may contain only L(↑,i). Therefore, in equation 5, $L_0$ and $n_c$ may comprise the unknowns (i.e., $L_i$ may be measured and L(↑,i) may be taken from an in-scene darkest pixel).

Embodiments of the disclosure may be based on the fact that pixels containing the predetermined gas (e.g., Methane) may have an $L_i$ slightly different than that expected from a scene's statistical spectral characteristics. Equation (5) may show how a spectrum may change when various amounts of the predetermined gas (e.g., Methane) are present. To measure a pixel spectrum's deviation from its expected spectrum, embodiments of the disclosure may construct a spectral matched filter based on the scene average spectrum and the scene spectral covariance.

Scene Average Spectrum:

$$\bar{L}_i = \frac{\sum_{k=all\ pixels} L_{i,k}}{\text{number of pixels}} \tag{6}$$

Scene Spectral Covariance:

$$C_{i,j} = \frac{1}{\text{number of pixels}}\sum_{k=all\ pixels}(L_{i,k} - \bar{L}_i)(L_{j,k} - \bar{L}_j) \tag{7}$$

To simplify the nomenclature by allowing use of standard matrix math, from this point forward L and $\alpha$ may be treated as column arrays and C as a square matrix. For the SWIR bands, L and $\alpha$ may have 8 elements and C may comprise an 8×8 array.

Figure 3:
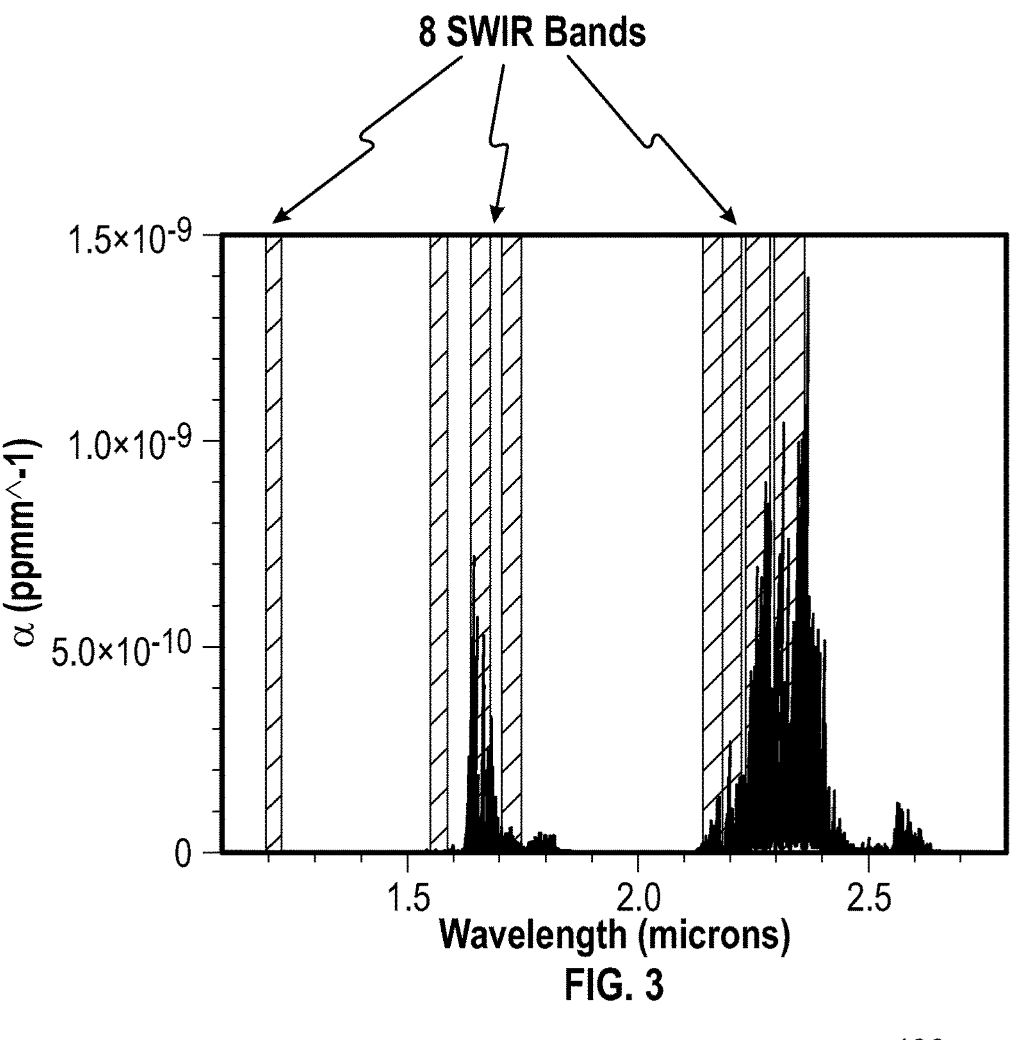
FIG. 3 illustrates a gas absorption cross-section.

It may be known in advance the $L_0$ for a given pixel, but on average it may be $\bar{L}$. Therefore, embodiments of the disclosure may construct a spectral matched filter for a predetermined gas (e.g., Methane) based on in-scene statistics optimally aligned with the predetermined gas' (e.g., Methane's) spectral features relative to the scene spectral covariance. FIG. 3 illustrates Methane's absorption cross-section for the 8 SWIR bands referenced above. Equation (8) illustrates a spectral matched filter for a predetermined gas.

$$f = \frac{\alpha(\bar{L} - L_{\uparrow})C^{-1}}{\alpha(\bar{L} - L_{\uparrow})C^{-1}[\alpha(\bar{L} - L_{\uparrow})]^T} \tag{8}$$

Once computing device 400 constructs the spectral matched filter for the predetermined gas and based on the image data in stage 220, method 200 may continue to stage 230 where computing device 400 may estimate a quantity of the predetermined gas in at least one of the plurality of pixels by applying the spectral matched filter to the image data. For example, the spectral matched filter f (i.e., equation (8)) may comprise an 8-element column array. The inner product of a dark removed spectrum and f is $-2n_c$.

$$f(L - L_{\uparrow})^T = -2n_c \tag{9}$$

The factor of 2 arises from the fact that light passes twice through gas plume 110 on its way to the sensor in satellite 105. Equation (9) may be solved for $n_c$ that may comprise an estimate of a quantity of the predetermined gas (e.g., Methane) in a given pixel as illustrated by equation (10).

$$n_c = -\frac{1}{2} f(L - L_{\uparrow})^T \tag{10}$$

This may be repeated for all pixels in the scene and aggregated in order to obtain an estimate of a quantity of the predetermined gas in the scene. This may be repeated for multiple scenes to obtain an estimate of a quantity of the predetermined gas in gas plume 110. Once computing device 400 estimates the quantity of the predetermined gas in at least one of the plurality of pixels by applying the spectral matched filter to the image data in stage 230, method 200 may then end at stage 240.

Figure 4:
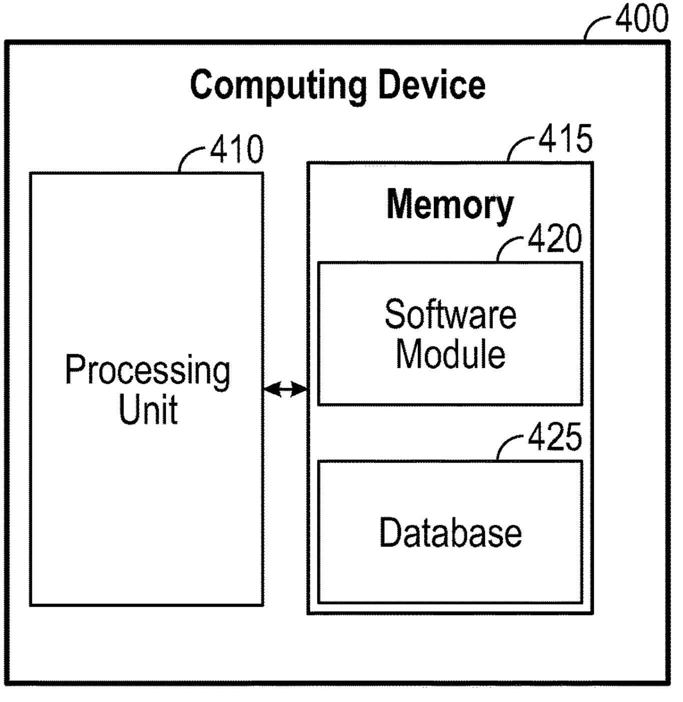
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for estimating gas quantity in a pixel based on spectral matched filtering as described above with respect to FIG. 2. Computing device 400, for example, may be deployed in in satellite 105. Notwithstanding, computing device 400 may be deployed anywhere and the image data may be transmitted from satellite 105 to a network, for example, and then sent to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving image data associated with a scene, wherein the scene comprises a plurality of pixels;

constructing a spectral matched filter for a predetermined gas based on a scene average spectrum $\bar{L}$ and a scene spectral covariance C from the image data; and estimating a quantity of the predetermined gas in at least one of the plurality of pixels by applying the spectral matched filter to the image data, wherein the spectral matched filter f comprises:

$$f = \frac{\alpha(\bar{L} - L_\uparrow)C^{-1}}{\alpha(\bar{L} - L_\uparrow)C^{-1}[\alpha(\bar{L} - L_\uparrow)]^T};$$

and wherein α is a spectral absorption of the gas and $L_\uparrow$ is atmospheric scattered light in the scene.

2. The method of claim 1, wherein the scene average spectrum in a spectral band i comprises:

$$\bar{L}_i = \frac{\sum_{k=all\ pixels} L_{i,k}}{\text{number of pixels}}.$$

3. The method of claim 1, wherein the scene spectral covariance comprises:

$$C_{i,j} = \frac{1}{\text{number of pixels}} \sum_{k=all\ pixels} (L_{i,k} - \bar{L}_i)(L_{j,k} - \bar{L}_j).$$

4. The method of claim 1, wherein constructing the spectral matched filter comprises constructing the spectral matched filter based on in-scene statistics optimally aligned with spectral features of the predetermined gas relative to the scene spectral covariance.

5. The method of claim 1, wherein the quantity of the predetermined gas comprises:

$$n_c = -\frac{1}{2} f(L - L_\uparrow)^T.$$

6. The method of claim 1, wherein the image data comprise spectral quantities representing spectral features in a Shortwave Infrared (SWIR) spectral range.

7. The method of claim 1, wherein the image data comprise spectral quantities representing spectral features in at least one of the following ranges: 1195 nm-1225 nm, 1550 nm-1590 nm, 1640 nm-1680 nm, 1710 nm-1750 nm, 2145 nm-2185 nm, 2185 nm-2225 nm, 2235 nm-2285 nm, and 2295 nm-2365 nm.

8. The method of claim 1, wherein the predetermined gas is methane.

9. A system comprising:

a memory storage; and a processing unit coupled to the memory storage, wherein the processing unit is operative to:

receive image data associated with a scene, wherein the scene comprises a plurality of pixels;

construct a spectral matched filter for a predetermined gas based on a scene average spectrum $\bar{L}$ and a scene spectral covariance C from the image data; and estimate a quantity of the predetermined gas in at least one of the plurality of pixels by applying the spectral matched filter to the image data, wherein the spectral matched filter f comprises:

$$f = \frac{\alpha(\bar{L} - L_\uparrow)C^{-1}}{\alpha(\bar{L} - L_\uparrow)C^{-1}[\alpha(\bar{L} - L_\uparrow)]^T};$$

and wherein α is a spectral absorption of the gas and $L_\uparrow$ is atmospheric scattered light in the scene.

10. The system of claim 9, wherein the scene average spectrum in a spectral band i comprises:

$$\bar{L}_i = \frac{\sum_{k=all\ pixels} L_{i,k}}{\text{number of pixels}}.$$

11. The system of claim 9, wherein the scene spectral covariance comprises:

$$C_{i,j} = \frac{1}{\text{number of pixels}} \sum_{k=all\ pixels} (L_{i,k} - \bar{L}_i)(L_{j,k} - \bar{L}_j).$$

12. The system of claim 9, wherein the processing unit is operative to construct the spectral matched filter based on in-scene statistics optimally aligned with spectral features of the predetermined gas relative to the scene spectral covariance.

13. The system of claim 9, wherein the quantity of the predetermined gas comprises:

$$n_c = -\frac{1}{2} f(L - L_\uparrow)^T.$$

14. The system of claim 9, wherein the image data comprise spectral quantities representing spectral features in a Shortwave Infrared (SWIR) spectral range.

15. A non-transitory computer-readable medium that stores a set of instructions which, when executed, perform a method comprising:

receiving image data associated with a scene, wherein the scene comprises a plurality of pixels;

constructing a spectral matched filter for a predetermined gas based on a scene average spectrum $\bar{L}$ and a scene spectral covariance C from the image data; and estimating a quantity of the predetermined gas in at least one of the plurality of pixels by applying the spectral matched filter to the image data, wherein the spectral matched filter f comprises:

$$f = \frac{\alpha(\bar{L} - L_{\uparrow})C^{-1}}{\alpha(\bar{L} - L_{\uparrow})C^{-1}\left[\alpha(\bar{L} - L_{\uparrow})\right]^{T}};$$

and wherein $\alpha$ is a spectral absorption of the gas and $L_{\uparrow}$ is atmospheric scattered light in the scene.

16. The non-transitory computer-readable medium of claim 15, wherein the scene average spectrum in a spectral band i comprises:

$$\bar{L}_i = \frac{\sum_{k=all\ pixels} L_{i,k}}{\text{number of pixels}}.$$

17. The non-transitory computer-readable medium of claim 15, wherein the scene spectral covariance comprises:

$$C_{i,j} = \frac{1}{\text{number of pixels}} \sum_{k=all\ pixels} (L_{i,k} - \bar{L}_i)(L_{j,k} - \bar{L}_j).$$

18. The non-transitory computer-readable medium of claim 15, wherein constructing the spectral matched filter comprises constructing the spectral matched filter based on in-scene statistics optimally aligned with spectral features of the predetermined gas relative to the scene spectral covariance.

19. The non-transitory computer-readable medium of claim 15, wherein the quantity of the predetermined gas comprises:

$$n_c = -\frac{1}{2} f (L - L_{\uparrow})^{T}.$$

20. The non-transitory computer-readable medium of claim 15, wherein the image data comprise spectral quantities representing spectral features in at least one of the following ranges: 1195 nm-1225 nm, 1550 nm-1590 nm, 1640 nm-1680 nm, 1710 nm-1750 nm, 2145 nm-2185 nm, 2185 nm-2225 nm, 2235 nm-2285 nm, and 2295 nm-2365 nm.

* * * * *